(12) United States Patent
Ruijters et al.

(10) Patent No.: US 8,427,475 B2
(45) Date of Patent: Apr. 23, 2013

(54) SILHOUETTE BLEND RENDERING OF ANATOMICAL STRUCTURES

(75) Inventors: Danny Ruijters, Eindhoven (NL); Peter Mielekamp, Veldhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 787 days.

(21) Appl. No.: 12/093,377

(22) PCT Filed: Nov. 2, 2006

(86) PCT No.: PCT/IB2006/054071
§ 371 (c)(1),
(2), (4) Date: May 12, 2008

(87) PCT Pub. No.: WO2007/054863
PCT Pub. Date: May 18, 2007

(65) Prior Publication Data
US 2008/0278492 A1 Nov. 13, 2008

Related U.S. Application Data

(60) Provisional application No. 60/736,272, filed on Nov. 14, 2005.

(51) Int. Cl.
*G06T 15/50* (2011.01)
*G06T 15/30* (2011.01)
(52) U.S. Cl.
USPC .......................................... 345/426; 345/423
(58) Field of Classification Search .................. None
See application file for complete search history.

(56) References Cited

U.S. PATENT DOCUMENTS

| | | | |
|---|---|---|---|
| 6,083,162 A * | 7/2000 | Vining | 600/407 |
| 6,608,627 B1 * | 8/2003 | Marshall et al. | 345/619 |
| 2006/0274885 A1 * | 12/2006 | Wang et al. | 378/65 |
| 2007/0019846 A1 * | 1/2007 | Bullitt et al. | 382/128 |
| 2008/0304615 A1 * | 12/2008 | Mielekamp | 378/4 |

FOREIGN PATENT DOCUMENTS

WO 2006018774 A1 2/2006

OTHER PUBLICATIONS

"Three-dimensional angiography for radiosurgical treatment planning for arteriovenous malformations" Colombo et al., 536-543, 2003.*
Richard A. Robb et al, "Analyze: A Software System for Biomedical Image Analysis", IEEE Comput. Soc., May 22, 1990, p. 507-518.
Ivan Viola et al, "Focus+Context Visualization of Features and Topological Structures", Technische Universitat Wien—Institut Fur Computergraphik, Wien, vol. TR-186-2-05-07, Sep. 2005, pp. 1-13.

(Continued)

*Primary Examiner* — Joni Richer
*Assistant Examiner* — Michelle Chin

(57) ABSTRACT

Systems and methods for rendering advantageous images/views of an anatomical structure, e.g., vessel structure(s), and surrounding anatomical features/structures are provided. The disclosed systems and methods combine conventional 3D x-ray rotational angiography (3DRA) with a diagnostic scan of the relevant anatomical region, e.g., a CT or MR scan, to yield a combined image/view thereof. The image includes silhouette rendering of structures and/or vessel anatomy below the CT/MRI slab, i.e., obscured vessel structures, thereby allowing clinicians and other medical/surgical staff to develop a better understanding of vessel morphology and relationships between vessel pathology and surrounding branches/anatomical structures.

18 Claims, 5 Drawing Sheets

OTHER PUBLICATIONS

Stefan Bruckner et al, "VolumeShop: An Interactive System for Direct Volume Illustration", Visualization, 2005, Minneapolis, MN, USA, Oct. 23-28, pp. 671-678.

Horst K. Hahn et al, "Visualization and Interaction Techniques for the Exploration of Vascular Structures", Proceedings Visualization 2001, San Diego, CA, Oct. 21-26, pp. 395-402.

Kaufman et al, "Intermixing Surface and Volume Rendering", 3D Imaging in Medicine, Springer-Verlag Berlin, 1990, p. 217-227.

Hu et al, "Volumetric Rendering of Multimodality, Multivariable Medical Imaging Data", Proc. CH Volume Visualization Workshop, May 1989, pp. 45-49.

Koenderink et al, "Shape Constancy in Pictorial Relief", Object Representation in Compouter Vision II, ECCV International Workshop, 1996, pp. 151-164.

Bercier et al, "Multimodality Image Fusion for Radiosurgery Localisation of Large AVMS", Proceedings of the 22nd Int. Conf. of THE IEEE Engineering in Medicine and Biology Society, Vol. 4, 2000, pp. 2689-2692.

Raskar et al, "Image Precision Silhouette Edges", Proceedings of the Symposium on Interactive 3D Graphics, Apr. 1999, pp. 135-140, 231.

* cited by examiner

SILHOUETTE BLEND RENDERING OF ANATOMICAL STRUCTURES

The present disclosure is directed to systems and methods for rendering advantageous images/views of an anatomical structure, e.g., vessel structure(s). More particularly, the present disclosure is directed to systems and methods for combining conventional 3D x-ray rotational angiography (3DRA) with a diagnostic scan of the relevant anatomical region, e.g., a CT or MR scan, to yield a combined image/view thereof. According to exemplary embodiments of the present disclosure, the image/view includes silhouette rendering of structures/vessel anatomy below the CT/MRI slab/cut. The disclosed systems and methods allow clinicians and other medical/surgical staff to develop a better understanding of vessel morphology and relationships between vessel pathology and surrounding branches/anatomical structures.

Interventional X-ray angiography procedures are generally based on real time, two-dimensional dimensional (2D) minimally invasive image guidance of endovascular material through the vasculature. Typically, interactive tracking of such endovascular material, e.g., a guide wire and/or catheter, have been achieved with an X-ray angiography instrument. Recently introduced three dimensional rotational angiography (3DRA) techniques have significantly improved upon standard 2D angio imaging techniques by adding a third imaging dimension. 3DRA imaging allows for better understanding and assessment of vessel morphology, as well as the mutual relationship of vessel pathology and surrounding branches.

In many clinical procedures, a diagnostic scan of the relevant anatomical region has already been obtained, e.g., using conventional CT and/or MR technology. Thus, the diagnostic scan information is frequently available for a patient who is undergoing a minimally invasive, interventional treatment. The potential for combining the CT or MR data set with the 3DRA data set, i.e., image fusion, has been investigated. However, to maximize the potential benefit to clinicians and other personnel, image fusion systems should be designed to present two independent 3D data sets (i.e., CT/MR and 3DRA data sets) in such a way that the combined image is easy to interpret and manipulate, while offering at the same time a maximum of clinically relevant information.

Prior approaches to image fusion has involved a presentation that combines 2D cross sections of both data sets. This presentation mode is not ideal, because it is impossible for a clinician to interpret the 3D morphology of a vessel from a 2D cross section. Moreover, the potential for obscuring anatomical structures of potential interest in the combined image has not previously been addressed.

Thus, despite efforts to date, a need remains for systems and methods that combine diagnostic data sets and 3DRA data sets in a manner that permits an understanding and/or interpretation of anatomical issues, including vessel/vasculature morphology. In addition, a need remains for systems and methods that combine diagnostic and 3DRA data sets in a manner that permits an understanding and/or interpretation of obscured portions of anatomical structures. Still further, a need remains for systems and methods that combine diagnostic and 3DRA data sets in a manner that permits an understanding and/or interpretation of the intersection between a diagnostic slab rendering and a 3DRA image of vessel/vasculature structure(s). These and other needs are satisfied by the systems and methods disclosed herein.

Systems and methods are disclosed herein for combining conventional 3D x-ray rotational angiography (3DRA) with a diagnostic scan of the relevant anatomical region, e.g., a CT or MR scan, to yield a combined image/view thereof. More particularly, the present disclosure is directed to systems and methods for combining conventional 3D x-ray rotational angiography (3DRA) and a diagnostic scan of the relevant anatomical region for rendering advantageous images/views of an anatomical structure, e.g., vessel structure(s), in combination with surrounding anatomical structures/features. According to exemplary embodiments of the present disclosure, the image/view includes silhouette rendering of structures, e.g., vasculature, below the CT or MR slab. The disclosed systems and methods allow clinicians and other medical/surgical staff to develop a better understanding of vessel morphology and relationships between vessel pathology and surrounding branches/anatomical structures.

According to exemplary implementations of the disclosed systems and methods, a diagnostic data set (e.g., CT, MR) for an anatomical region-of-interest is obtained and stored in a database in communication a processing unit. Thereafter, a 3D-rotational angiography (3DRA) data set is obtained for an anatomical structure, e.g., vasculature or the like, and the data set is stored in a database in communication with the above-noted processing unit. Registration of the CT and/or MR data set with the 3DRA data set is effected by the processing unit, thereby allowing the combined rendering of both data sets.

In generating images/views based on the combined data sets, the disclosed systems and methods display the vasculature (based on the 3DRA data set) and a slab from the diagnostic data set (based on CT or MR imaging), as well as the intersection of the vasculature with the slab. Moreover, the disclosed system/method advantageously generates an image/view that includes the portion of the vasculature that is obscured by the slab in silhouette. The present invention thus provides systems and methods for optimal presentation of the large amount data that is the result of combining 3DRA imaging with CT or MR diagnostic data. The combined rendering of such data, particularly with a silhouetted view of the obscured vasculature, represents a significant advance in providing clinically useful data to a clinician or other system user.

Technical implementation of the disclosed systems and methods generally utilizes several existing techniques in generating the underlying data sets. More particularly, conventional CT and/or MR equipment and imaging techniques are generally employed to generate the requisite diagnostic data set(s). The diagnostic data set(s) are transmitted to and stored within an appropriate data storage means, e.g., computer memory with an appropriate database architecture for data manipulation, as described herein. Similarly, conventional 3DRA equipment and imaging techniques are generally employed to generate the requisite 3DRA data set(s). The 3DRA data set(s) are also transmitted to and stored within an appropriate data storage means, e.g., computer memory with an appropriate architecture for data manipulation, as described herein. The diagnostic data set(s) and the 3DRA data set(s) may be stored in the same data storage means or in distinct data storage means, provided such data storage means are accessible to processing unit(s) responsible for registration and processing of the data sets stored therein, as described herein.

According to exemplary embodiments of the present disclosure, processing of the data sets to generate advantageous images/renderings as described herein involves the following processing steps or techniques:

Registration of the 3DRA data set and the diagnostic data set, e.g., generated from CT or MR imaging. Algorithms and/or methodologies for data set registration are known to persons skilled in the art and such known algorithms and/or methodologies may be employed according to the present disclosure. For example, F. Maes, A. Collignon, D. Vandermeulen, G. Marchal and P. Suetens describe a method for registering multimodal data sets ("Multimodality Image Registration by Maximization of Mutual Information," IEEE Transactions on Medical Imaging, Volume 16, Number 2, pp. 187-198, April 1997). The content of the foregoing Maes et al. publication is incorporated herein by reference.

Segmentation of the vessel/vasculature data from a 3DRA volume. Segmentation is facilitated by the fact that the contrast medium injected in the vessel/vasculature assures that the intensities of the vessel voxels in the 3DRA volume are much higher than the intensities of the other voxels.

Obtaining a triangulated mesh or other polygonal representation from the segmented data. Algorithms and/or methodologies for generating triangulated mesh from segmented data are known to persons skilled in the art and such known algorithms and/or methodologies may be employed according to the present disclosure. For example, W. E. Lorensen and H. E. Cline describe a method for generating a polygonal representation of constant density surfaces from a 3D array of data ("Marching Cubes: A High Resolution 3D Surface Construction Algorithm," Computer Graphics, Volume 21, Number 4, pp. 163-169, July 1987). The content of the foregoing Lorensen et al. publication is incorporated herein by reference.

Blending, intermixing or combining: (i) triangulated meshes associated with 3DRA imaging, and (ii) volume rendering data associated with diagnostic data sets, e.g., generated from CT or MR imaging. Algorithms and/or methods for blending, intermixing or combining surface and volume renderings are known to persons skilled in the art and such known algorithms and/or methodologies may be employed according to the present disclosure. For example, A. Kaufman, R. Yagel and D. Cohen disclose four approaches for intermixing geometric models with sampled 3D medical data ("Intermixing Surface and Volume Rendering," 3D Imaging in Medicine, Springer-Verlag Berlin Heidelberg, pp. 217-227, 1990). By way of further example, M. Frühauf describes an alternative approach wherein independent algorithms are used for volume rendering and surface representations, and the independent renderings are then merged ("Combining Volume Rendering with Line and Surface Rendering," Eurographics'91, Elsevier Science Publishers B. V., pp. 21-32, 523). The contents of the foregoing Kaufman et al. and Frühauf publications are incorporated herein by reference.

Silhouette rendering of the obscured portions of the vessel/vasculature. Algorithms and/or methods for generating a silhouette rendering are known to persons skilled in the art and such known algorithms and/or methodologies may be employed according to the present disclosure. For example, R. Raskar and M. Cohen disclose a technique for displaying silhouettes that involves, inter alia, using a depth buffer and running a rendering process that computes the intersection of adjacent front and back-facing surfaces in image space at interactive rates ("Image Precision Silhouette Edges," Proceedings of the 1999 Symposium on Interactive 3D Graphics, Atlanta, GA, Apr. 26-29, 1999, ACM Press, pp. 135-140, 1999). The content of the foregoing Raskar et al. publication is incorporated herein by reference.

Thus, the systems and methods of the present disclosure offer significant benefits to clinicians engaged in interventional or diagnostic procedures. For example, the disclosed systems and methods advantageously permit the full morphology of a vessel tree in the 3DRA data to be assessed, even the parts that are obscured by the CT or MR data set. Further the intersection of both data sets is clearly visible, which enables the interpretation of the spatial relationship between both data sets. These advantageous results are accomplished without cluttering the screen with extraneous and/or confusing data, thus allowing easy and intuitive interpretation.

Additional features, functions and benefits of the disclosed systems and methods will be apparent from the detailed description which follows, particularly when read in conjunction with the figures appended hereto.

To assist those of ordinary skill in the art in making and using the disclosed systems and methods for rendering of anatomical structures, reference is made to the accompanying figures, wherein.

The present disclosure provides advantages systems and methods for generating images of particular use in interventional and diagnostic applications, e.g., in the treatment of vessel pathologies. The disclosed systems and methods combine data sets generated through diagnostic scanning, e.g., CT, MR, XperCT imaging, with data sets associated with segmented vessels obtained from 3D rotational angiography (3DRA). More particularly, the disclosed systems and methods facilitate interventional and diagnostic procedures by providing/generating a display/image that includes (i) a slab from the diagnostic scanning, (ii) the segmented vessels, including silhouetted images of the parts of the vessels that are obscured by the slab, and (iii) the intersection of the slab and segmented vessels. The disclosed systems and methods provide the user/clinician with a maximum amount of information, without compromising the ease of use and interpretation.

Thus, in exemplary embodiments of the present disclosure, systems and methods are provided for combining conventional 3D x-ray rotational angiography (3DRA) with a diagnostic scan of the relevant anatomical region, e.g., a CT or MR scan, to yield a combined image/view thereof and to render images/views of an anatomical structure, e.g., vessel structure(s), in combination with surrounding anatomical structures/features. Clinicians and other medical/surgical staff are thereby better able to develop an understanding of vessel morphology and relationships between vessel pathology and surrounding branches/anatomical structures.

Figure 1:
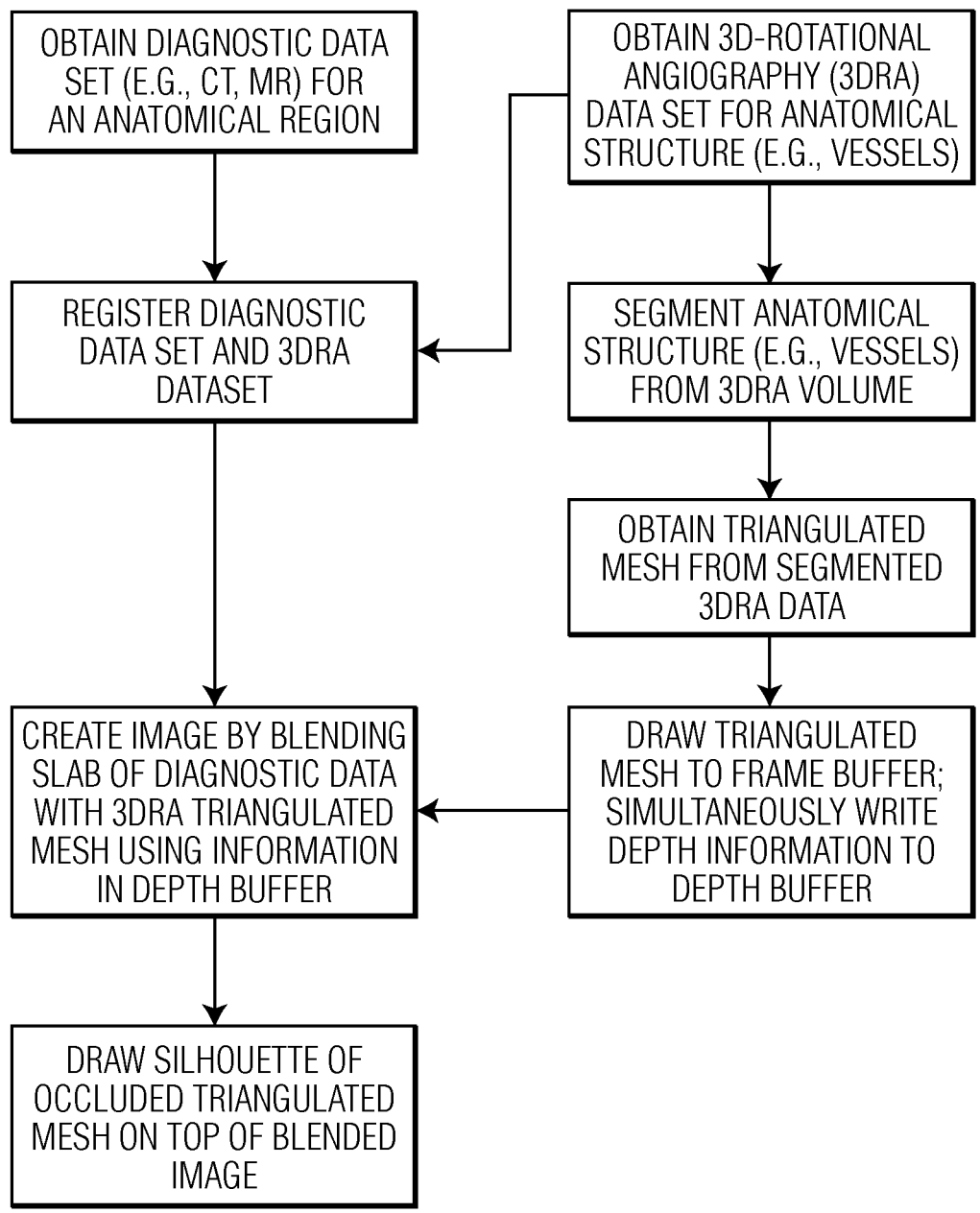
FIG. 1 is a flowchart of an exemplary method for rendering anatomical structures according to the present disclosure.
Figure 2:
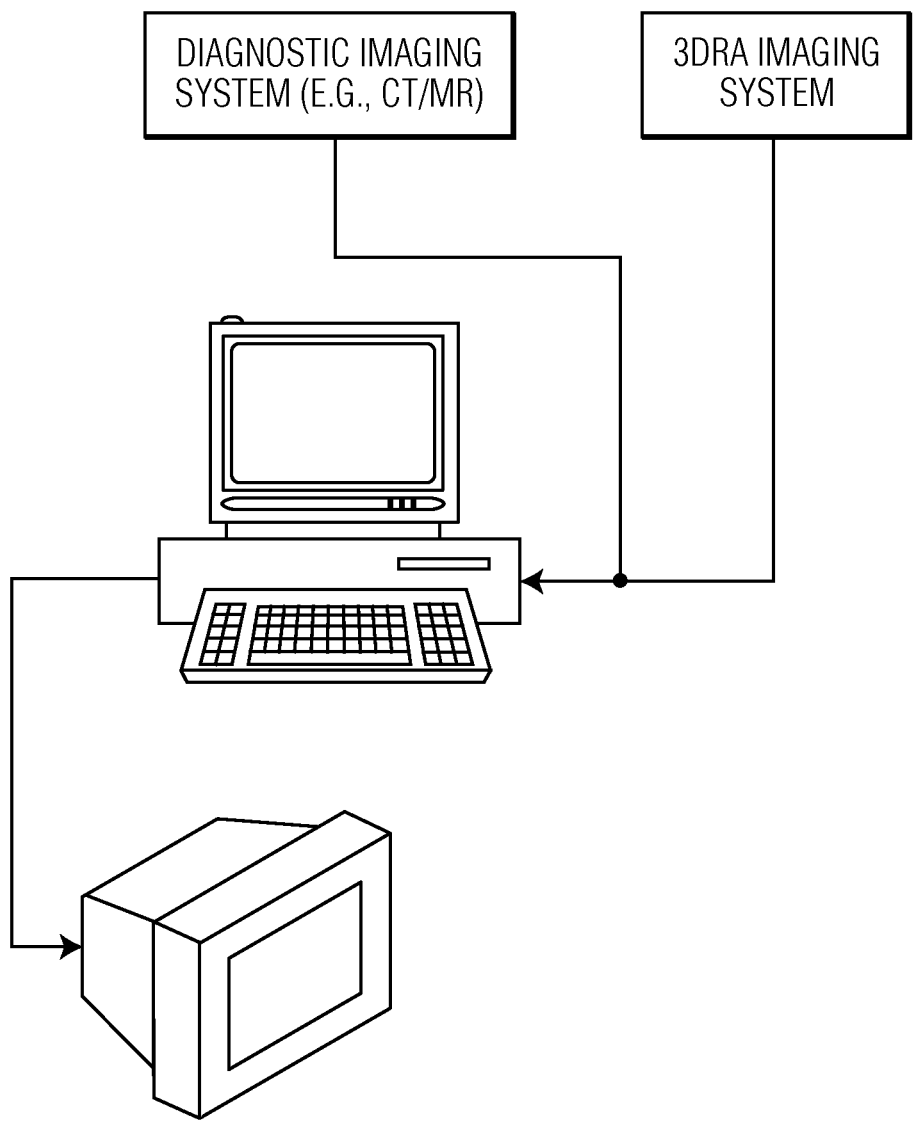
FIG. 2 is a schematic flowchart of exemplary data collection techniques according to the present disclosure.

With reference to FIGS. 1 and 2, exemplary implementations of the disclosed systems and methods are adapted to obtain a diagnostic data set (e.g., CT, MR) for an anatomical region-of-interest and store such data set in an appropriately architected database. The design and operation of the diagnostic system is not critical to the design and/or operation of the disclosed systems and methods. Rather, the present disclosure has application to any diagnostic system that is adapted to image a region of interest, e.g., conventional CT and MR systems. Transmission of the diagnostic data set to an appropriate database is routine in the design and operation of conventional CT and MR systems, and the systems/methods of the present disclosure are generally designed to access diagnostic data sets from conventional storage media, e.g., computer memory associated with a processing unit such as a CPU, server or the like. The computer memory/processing unit are typically co-located, in whole or in part, with the CT/MR system, although network-based communications with a centrally located and/or remotely located processing unit and/or data storage unit are contemplated according to the present disclosure, e.g., network-based communication systems such as an intranet, extranet, local area network, wide area network, distributed network that includes Internet-based communications, and the like.

In addition to a diagnostic data set, the system and method of the present disclosure obtains a 3D-rotational angiography (3DRA) data set for an anatomical structure, e.g., vasculature or the like. The 3DRA data set is also stored in an appropriately architected database that is in communication with the above-noted processing unit. As with the diagnostic systems discussed above, the design and operation of the 3DRA system is not critical to the design and/or operation of the disclosed systems and methods. Rather, the present disclosure has application to any 3DRA system that is adapted to generate a data set for use in generating an image of an anatomical structure of interest (such as vessel(s) and/or vasculature), e.g., a conventional 3DRA system. Transmission of the 3DRA data set to an appropriate database is routine in the design and operation of conventional 3DRA systems, and the systems/methods of the present disclosure are generally designed to access 3DRA data sets from conventional storage media, e.g., computer memory associated with a processing unit such as a CPU, server or the like. As with the diagnostic system described hereinabove, the computer memory/processing unit are typically co-located, in whole or in part, with the 3DRA system, although network-based communications with a centrally located and/or remotely located processing unit and/or data storage unit are contemplated according to the present disclosure, e.g., network-based communication systems such as an intranet, extranet, local area network, wide area network, distributed network that includes Internet-based communications, and the like.

With further reference to FIGS. 1 and 2, the 3DRA data set is typically processed so as to segment the anatomical structure, e.g., the vessel(s)/vasculature, from the 3DRA volume. Segmenting of the vessel/vasculature is facilitated because the vessel/vasculature generally includes injected contrast media yielding a significantly different voxel intensity as compared to the vessel/vasculature. Indeed, the voxels associated with the vessel/vasculature are typically of significantly greater intensity as compared to the adjacent contrast media. Segmenting of the 3DRA data sets is generally achieved by a segmenting program/algorithm that runs on a processing unit and that draws on the 3DRA data set(s) in an associated database/computer storage.

The segmented 3DRA data is used to generate triangular meshes for the imaged vessel/vasculature. As noted previously, algorithms for generating triangular meshes/polygons for segmented data sets are known in the art (see, e.g., the Lorensen et al. publication, previously incorporated herein by reference). According to exemplary embodiments of the disclosed systems/methods, the triangular mesh data is drawn to a frame buffer that supports the disclosed image processing/rendering functionality. Simultaneously, the depth information associated therewith is written to a depth buffer associated with such processing/rendering functionality. Techniques for processing such data, including utilization of frame buffers/depth buffers in connection therewith, are known in the art. Reference is made to the text entitled "OpenGL Programming Guide: The Official Guide to Learning OpenGL" (red book), authored by D. Shreiner, M. Woo, J. Neider and T. Davis, Addison-Wesley Pub. Co., $4^{th}$ ed., 2003, the contents of which being incorporated herein by reference.

Figure 3:
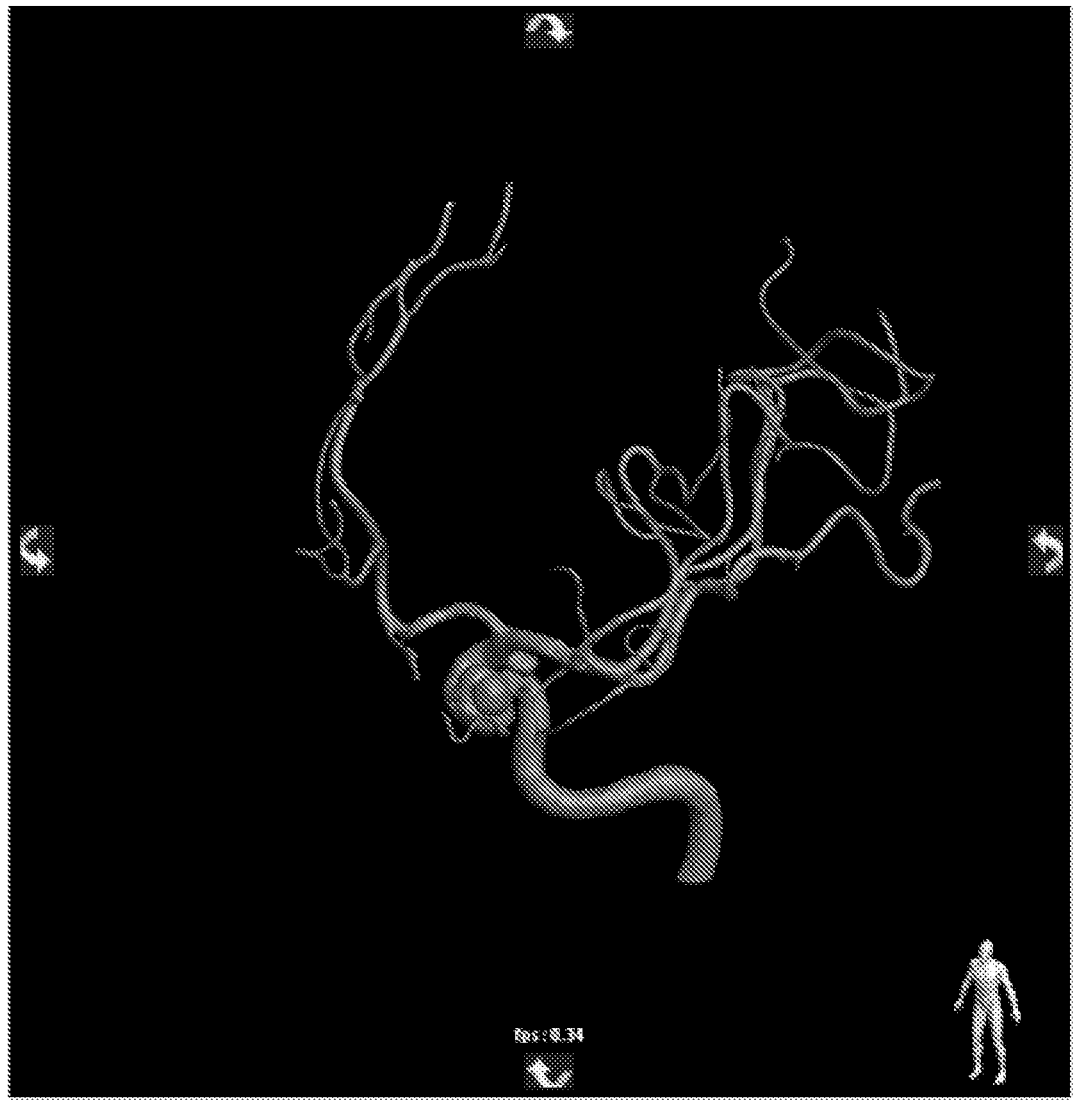
FIG. 3 is an image of a segmented vessel generated from a 3DRA data set.

With reference to FIG. 3, an exemplary image of a segmented vessel tree based upon a typical 3DRA data set is provided. The image of FIG. 3 is generated exclusively based upon the data set(s) associated with a conventional 3DRA imaging process, i.e., the image of FIG. 3 does not draw upon any diagnostic information/data that may be derived from a CT/MR imaging process.

Registration of the CT and/or MR data set with the triangulated mesh data derived from the 3DRA data set is effected by the processing unit associated with the disclosed system/method, thereby allowing the combined rendering of both data sets. The disclosed system and method are thus adapted to blend a slab of the diagnostic data, i.e., imaging data generated by a CT or MR unit, using conventional volume rendering techniques. The volume rendered diagnostic data is advantageously blended with the triangulated mesh by using the 3DRA information in the depth buffer and traversing the volume rendering integral from back-to-front. As noted previously, algorithms and techniques for blending surface and volume renderings are known in the art (see, e.g., the Kaufman et al. and Frühauf publications, previously incorporated herein by reference).

Control and/or selection of the images to be displayed by disclosed system/method is generally effected by a system user, e.g., a clinician or other supporting personnel. Thus, for example, through keyboard and/or mouse interaction with the processing system, a clinician or other system user is generally able to select the anatomical location at which the slab is to be taken/cut. After viewing a first slab/vasculature combination, the system user is able to select a second location and repeat the process, thereby accessing valuable information at various anatomical locations of potential interest.

Figure 4:
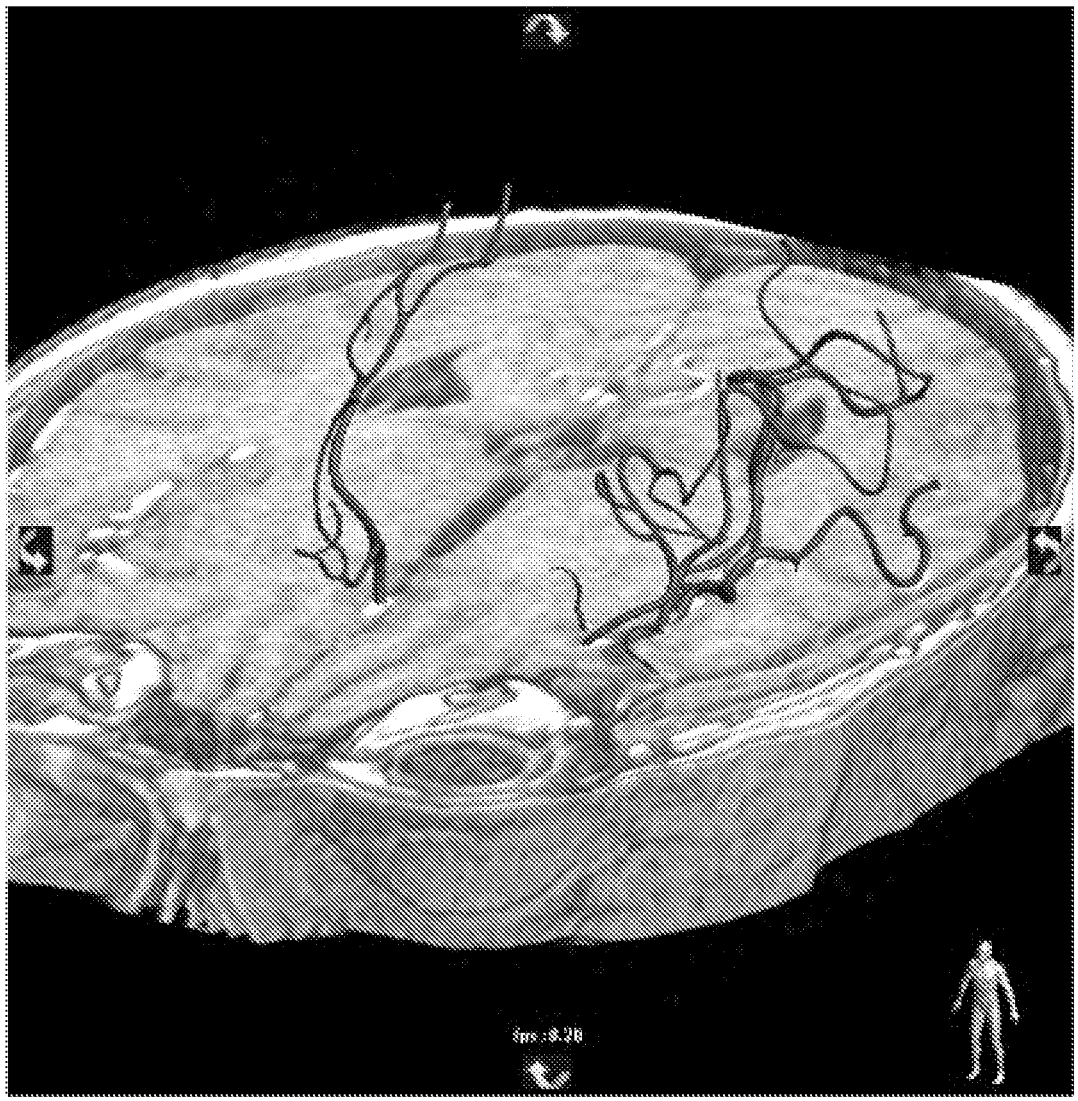
FIG. 4 is an image of a segmented vessel generated from a 3DRA data set combined with a slab from a MR data set.

With reference to FIG. 4, an exemplary image of the segmented vessel of FIG. 3, together with a MR slab is provided. As shown in FIG. 4, the disclosed systems and methods are effective in generating images/views based on the combined diagnostic/3DRA data sets that display the vasculature (based on the 3DRA data set) and a slab from the diagnostic data set (based on CT or MR imaging), as well as the intersection of the vasculature with the slab.

Of particular significance for purposes of the present disclosure, the systems and methods disclosed herein are advantageously designed/adapted to generate an image or view that includes the portion or portions of the vasculature that are otherwise obscured by the slab. The silhouetted portion of the vessel/vasculature advantageously commences at the plane of the slab intersection with the segmented 3DRA image of the vessel/vasculature. As noted previously, algorithms and techniques for silhouette rendering are known in the art (see, e.g., the Raskar et al. publication, previously incorporated herein by reference).

Figure 5:
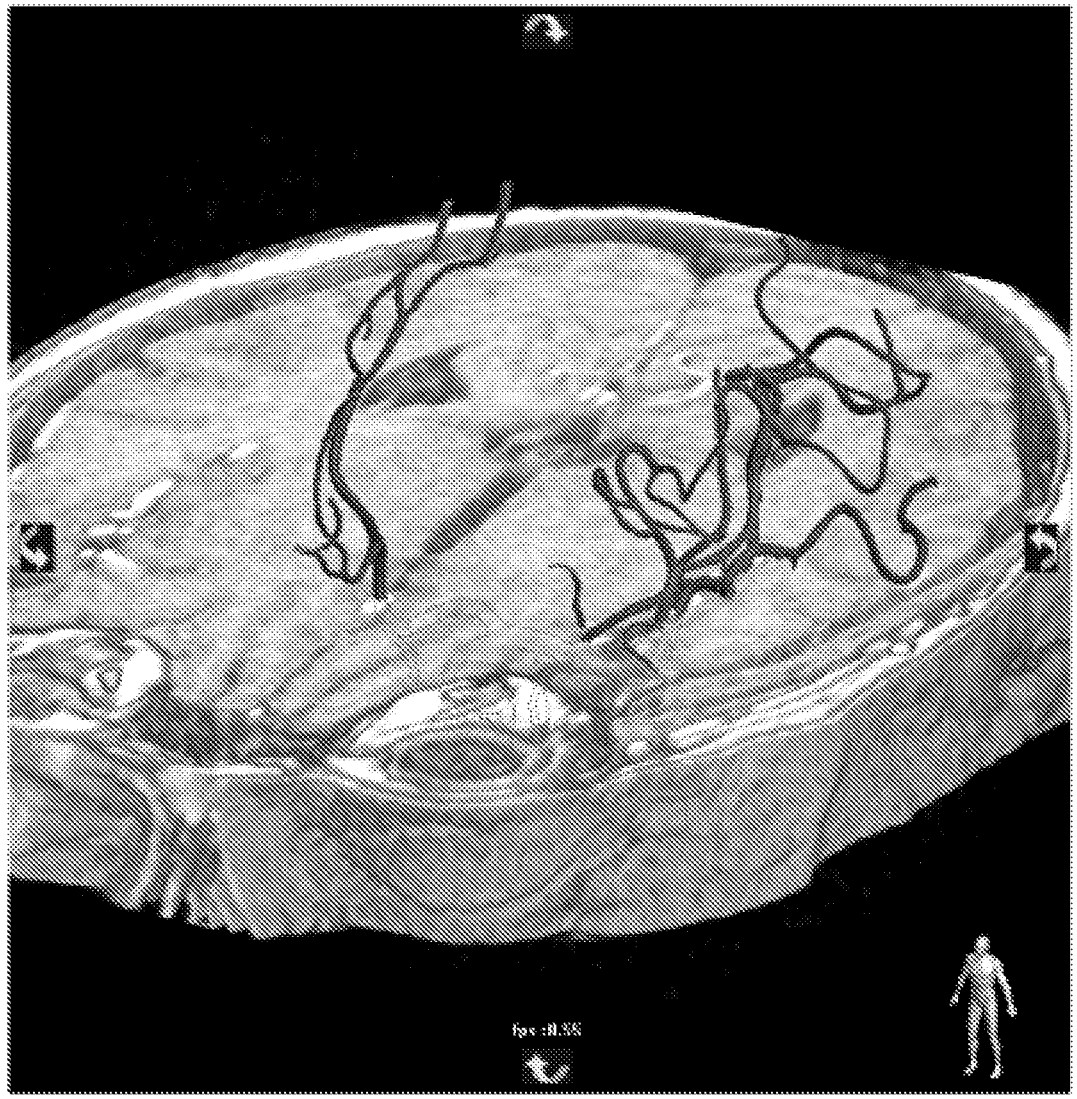
FIG. 5 is an image of the segmented vessel and MR slab of FIG. 4, that additionally includes silhouette blend rendering of the obscured portion of the segmented vessel.

Thus, with reference to FIG. 5, an exemplary image of a segmented 3DRA vessel and MR slab, together with a silhouetted image of the obscured vessel, is provided. By comparing the images of FIGS. 3-5, it is readily apparent with specific reference to FIG. 5 that the systems and methods of the present disclosure are effective in providing a complete view of the vessel/vasculature (derived from 3DRA imaging) together with a diagnostic slab (derived from CT/MR or other diagnostic imaging), thereby enabling a clinician to better understand/appreciate the overall anatomical context of his/her view of the region-of-interest. Through a clear view of the plane of intersection between the diagnostic slab and the vessel/vasculature, the clinician or other system user is better able to relate the diagnostic data with the patient's anatomy as a whole.

The present invention thus provides systems and methods for optimal presentation of the large amount data that is the result of combining 3DRA imaging with CT or MR diagnostic data. The combined rendering of such data, particularly with a silhouetted view of the obscured vasculature, represents a significant advance in providing clinically useful to data to a clinician or other system user.

As noted above, the disclosed systems and methods may be implemented using conventional CT and/or MR equipment and imaging techniques to generate the requisite diagnostic data set(s), as well as conventional 3DRA equipment and imaging techniques to generate the requisite 3DRA data set(s). The diagnostic data set(s) and the 3DRA data set(s) may be stored in the same data storage means or in distinct data storage means, provided such data storage means are accessible to processing unit(s) responsible for registration and processing of the respective data sets, as described herein. Although the present invention has been described with reference to exemplary implementations utilizing data sets derived from 3DRA and CT/MR imaging systems, it is to be understood that the present invention is not limited thereby; rather, the disclosed systems and methods may be used to generate advantageous images/views based on data sets derived from any 3D volume imaging system and any technique that generates data sets/images akin to the 3DRA data sets/images described herein.

In sum, the systems and methods of the present disclosure offer significant benefits to clinicians engaged in interventional or diagnostic procedures. For example, the disclosed systems and methods advantageously permit the full morphology of a vessel tree in the 3DRA data to be assessed, even the parts that are obscured by the CT or MR data set. Further the intersection of both data sets is clearly visible, which enables the interpretation of the spatial relationship between both data sets. These advantageous results are accomplished without cluttering the screen with extraneous and/or confusing data, thus allowing easy and intuitive interpretation. The disclosed systems and methods are also useful, for example, during minimally invasive interventional treatment of vascular pathologies and endovascular treatment of neoplastic tissue, where it is of great clinical benefit to obtain morphologic assessment of the tissue inside and surrounding the vessel. The present disclosure provides an advantageous technique for visualizing this information by combining multi-modality 3D volumes (e.g. CT, MR, XperCT, etc) with 3DRA volumes. Clinical advantages include a better orientation and understanding of the local anatomy during clinical treatment of a variety of conditions, e.g., ischemic strokes, stenosis, aneurysms and arteriovenous malformations located in the head, the localization of bleedings caused during minimal invasive procedures, localized radio-therapy of tumors, etc. The disclosed systems and methods may also be used advantageously in interventional X-ray angiography procedures.

Although the present disclosure has been described with reference to exemplary embodiments and implementations thereof, the disclosed systems and methods are not limited to such exemplary embodiments/implementations. Rather, the disclosed systems and methods are susceptible to many modifications, variations and/or enhancements without departing from the spirit or scope of the present disclosure. Accordingly, the present disclosure expressly encompasses such modifications, variations and/or enhancements within its scope.

The invention claimed is:

1. The method for generating an image, comprising:
    obtaining 3D rotational angiography (3DRA) data set(s) for an anatomical region containing an anatomical structure;
    segmenting the anatomical structure from the 3DRA data set(s);
    obtaining an independent 3D diagnostic data set(s) for the anatomical region, the independent 3D diagnostic data set being different from the 3DRA data set;
    registering the 3DRA and the 3D diagnostic data set(s) in the anatomical region;
    selecting a slab portion of the 3D diagnostic data set(s), the slab portion being smaller than the anatomical region;
    generating a silhouette rendering of a portion of the anatomical structures segmented from the 3DRA data sets(s) which is disposed in the slab portion, the silhouette rendering depicting only edges of the segmented anatomical structure, the edges being distinguishable from the slab portion when the silhouette rendering is combined with the slab portion;
    combining a portion of the segmented 3DRA data set(s) that is disposed outside of the slab, the silhouette rendering of the portion of the anatomical structures segmented from the 3DRA data set(s) that is disposed in the slab portion, and the slab portion of the 3D diagnostic data set(s); and
    generating an image that combines:
        the slab portion of the 3D diagnostic data set(s),
        a surface or volume rendering of the anatomical structure segmented from the 3DRA data set(s) disposed outside of the slab portion, and
        the silhouette rendering of the portion of anatomical structure in the slab portion.

2. The method according to claim 1, wherein the anatomical structure is at least one of a vessel, a vessel tree and a vasculature.

3. The method according to claim 1, wherein the 3D diagnostic data set(s) is obtained from a diagnostic imaging system selected from the group consisting of a CT imaging system and a MR imaging system.

4. The method according to claim 1, further including:
    selecting the slab portion manually.

5. The method according to claim 4, wherein the selection of the slab portion is made by a system user interacting with a keyboard, mouse or the like.

6. The method according to claim 1, wherein the 3DRA data set(s) and the 3D diagnostic data set(s) are transmitted to data storage across a network.

7. The method according to claim 6, wherein the data storage is in communication with at least one processing unit, and wherein the processing unit is programmed to combine the 3DRA data set(s), the slab portion of the diagnostic data set(s), and the silhouette rendering to generate the image.

8. The method according to claim 1, further including:
    changing a position of the selected slab portion relative to the surface or volume rendering of the segmented anatomical structure to change the portion of the surface or volume rendering of the segmented anatomical structure that is obscured by the slab portion in the image.

9. The method according to claim 1, wherein in the silhouette rendering only edges of the segmented structure as an intersection of front and back facing surfaces of the structure are depicted visibly 10. A non-transitory computer readable medium carrying software for controlling one or more processors to perform the method according to claim 1.

11. The system for generating an image, comprising:
   a) at least one computer storage unit that includes one or more databases; and
   b) at least one processing unit in communication with the at least one computer storage unit and being programmed to:
      i. segment an anatomical structure from 3D rotational angiography (3DRA) data set(s) of an anatomical region associated with the anatomical structure with a surface or volume rendering;
      ii. select a slab portion of 3D diagnostic data set(s) associated with a region smaller than the segmented anatomical structure;
      iii. generate a silhouette rendering depicting a portion of the segmented anatomical structure obscured by the slab portion;
      iv. combine the slab portion of the 3D diagnostic data set(s), the surface or volume rendering of the anatomical structure segmented from the 3DRA data set(s) not obscured by the slab portion, and the silhouette rendering of the portion of the anatomical structure obscured by the slab portion, the silhouette rendering depicting only edges of the anatomical structure and when the silhouette rendering is combined with the slab portion, the slab portion is visible between the edges.

12. The system according to claim 11, wherein the at least one processing unit is further programmed to change a position of the selected slab portion relative to the segmented anatomical structure under control of an input device to change the portion of the segmented anatomical structure that is obscured by the slab portion.

13. The system according to claim 11, wherein the 3DRA data set is generated with a 3DRA imaging system and the 3D diagnostic data set is obtained from a diagnostic imaging system different from the 3DRA imaging system and selected from the group consisting of a CT imaging system and a MR imaging system.

14. The system according to claim 11, further including:
   a network over which the 3DRA data set(s) and the diagnostic data set(s) are transmitted to the at least one computer storage unit.

15. The system according to claim 11, wherein in the silhouette rendering, only edges of the segmented structure as an intersection of front and back-facing surfaces of the structure are depicted visibly.

16. A diagnostic imaging system comprising:
   one or more processors programmed to:
      segment blood vessels from 3DRA data to generate a 3D surface image presentation of the blood vessels,
      generate a 3D slab image of a region in which a portion of the segmented blood vessels are located and obscured;
      combine the slab image and the segmented blood vessels such that a portion of the segmented blood vessels which are not obscured by the slab image are displayed as a surface or volume rendering and the portion of the segmented vessels that are obscured by the slab are displayed as a silhouette, the silhouette depicting only edges of the anatomical structure, the edges being distinguishable from the slab image when the slab image and the segmented blood vessels are combined.

17. The system according to claim 16, further including:
   a user input by which a user selects the region in which the slab image is generated such that the user changes the portions of the segmented blood vessels that are displayed as the surface rendering and in the silhouette.

18. The system according to claim 16, wherein the 3DRA data is generated by a 3DRA imaging system and the slab data is generated by an imaging system different from the 3DRA imaging system.

* * * * *